United States Patent
Ethridge et al.

(10) Patent No.: US 11,209,103 B2
(45) Date of Patent: *Dec. 28, 2021

(54) VERTICAL PIPE DEPLOYMENT SYSTEM AND METHOD

(71) Applicant: Trinity Bay Equipment Holdings, LLC, Houston, TX (US)

(72) Inventors: Andrew David Ethridge, Oak Ridge, TN (US); David Michael Gregory, Spring, TX (US); Mark Douglas Kalman, Luthersville, GA (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/223,095

(22) Filed: Apr. 6, 2021

(65) Prior Publication Data

US 2021/0222797 A1 Jul. 22, 2021

Related U.S. Application Data

(63) Continuation of application No. 17/003,596, filed on Aug. 26, 2020, now Pat. No. 11,009,151.

(60) Provisional application No. 62/897,083, filed on Sep. 6, 2019.

(51) Int. Cl.
| | |
|---|---|
| *F16L 3/00* | (2006.01) |
| *F16L 1/036* | (2006.01) |
| *F16L 1/06* | (2006.01) |
| *F16L 11/00* | (2006.01) |
| *F16L 3/10* | (2006.01) |

(52) U.S. Cl.
CPC ............... *F16L 1/036* (2013.01); *F16L 1/06* (2013.01); *F16L 3/1091* (2013.01); *F16L 11/00* (2013.01); *F16L 2201/00* (2013.01)

(58) Field of Classification Search
CPC . F16L 1/036; F16L 1/06; F16L 3/1091; F16L 3/16; F16L 3/26; F16L 3/02; F16L 3/08; F16L 3/1058; F16L 3/12; F28D 1/047; F28D 1/0477
See application file for complete search history.

(56) References Cited

U.S. PATENT DOCUMENTS

| | | | | |
|---|---|---|---|---|
| 1,210,701 A | * | 1/1917 | Ryden | F16L 3/12 248/74.1 |
| 3,672,006 A | * | 6/1972 | Fidrych | F16G 11/02 24/122.6 |
| 3,847,331 A | * | 11/1974 | Vallinotto | F16L 3/12 248/74.3 |

(Continued)

OTHER PUBLICATIONS

Shureseal; Flexible Metallic Liquidtight Conduits'; All; May 2015 (Year: 2015).*

(Continued)

*Primary Examiner* — Benjamin F Fiorello
(74) *Attorney, Agent, or Firm* — Fletcher Yoder, P.C.; Matthew G. Osterhaus

(57) ABSTRACT

A vertical pipe deployment system that includes a flexible pipe deployed vertically in a non-linear manner. A first clamp couples to and supports the flexible pipe. A second clamp couples to the flexible pipe. The second clamp laterally changes a direction of the flexible pipe as the flexible pipe descends vertically between the first clamp and the second clamp.

11 Claims, 7 Drawing Sheets

(56) References Cited

U.S. PATENT DOCUMENTS

| | | | |
|---|---|---|---|
| 4,437,791 A | | 3/1984 | Reynolds |
| 4,514,005 A | * | 4/1985 | Fallon ............... F16L 3/003 24/115 N |
| 4,601,507 A | * | 7/1986 | Fallon ............... F16L 3/003 24/115 N |
| 4,716,960 A | | 1/1988 | Eastlund et al. |
| 5,054,541 A | | 10/1991 | Tripp |
| 6,000,459 A | | 12/1999 | Jeppesen |
| 6,527,478 B2 | | 3/2003 | Finzel et al. |
| 2003/0021633 A1 | | 1/2003 | Seto et al. |
| 2009/0224533 A1 | | 9/2009 | Richter |
| 2010/0139886 A1 | | 6/2010 | Desmeules |
| 2015/0159781 A1 | * | 6/2015 | Wilson ............... F16L 3/227 248/67.5 |
| 2017/0276261 A1 | | 9/2017 | Hargrave |
| 2018/0080686 A1 | | 3/2018 | Ziegenfuss |
| 2019/0036314 A1 | * | 1/2019 | Toll ............... H02G 3/0456 |
| 2019/0301505 A1 | | 10/2019 | Tjerrild |

OTHER PUBLICATIONS https://www.trelleborg.com/en/offshore/products-and-applications/subsea-operations-protected-by-njord/njord-clamp/njord-rc-riser-clamp; Jul. 18, 2019.
https://www.slingco.com/us/products/cable-conductor-installation-pulling/cable-pulling-grips?lcc=true; Apr. 10, 2019.

* cited by examiner

VERTICAL PIPE DEPLOYMENT SYSTEM AND METHOD

CROSS-REFERENCE

The present disclosure is continuation of U.S. patent application Ser. No. 17/003,596, entitled "VERTICAL PIPE DEPLOYMENT SYSTEM AND METHOD" and filed Aug. 26, 2020, which claims the benefit of and priority to U.S. Provisional Patent Application No. 62/897,083, entitled "VERTICAL PIPE DEPLOYMENT SYSTEM AND METHOD" and filed on Sep. 6, 2019, which are each incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Flexible pipe is useful in various environments, including in the oil and gas industry. Flexible pipe may be durable and operational in harsh operating conditions and can accommodate high pressures and temperatures. Flexible pipe may also be packaged into a coil or onto a reel to facilitate transport and use of the pipe. The flexible pipe may be transported as coils or reels to various sites for deployment (also referred to as uncoiling or unspooling). Flexible pipe is often deployed over long distances in a generally horizontal orientation. In a vertical orientation, however, flexible pipe may experience excessive tension over long distances. As such, flexible pipe may not have been considered suitable for deployment in vertical applications over such long distances.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one example, a vertical pipe deployment system includes a flexible pipe deployed vertically in a nonlinear manner. A first clamp couples to and supports the flexible pipe. A second clamp couples to the flexible pipe. The second clamp laterally changes a direction of the flexible pipe as the flexible pipe descends vertically between the first clamp and the second clamp.

In another example, a vertical pipe deployment system includes a flexible pipe deployed vertically in a non-linear manner. A first plurality of clamps couple to and support the flexible pipe. The first plurality of clamps are vertically spaced and laterally offset from neighboring clamps of the first plurality of clamps.

In another example, a method of deploying flexible pipe vertically includes coupling a first plurality of clamps to a vertical surface. The first plurality of clamps are vertically offset and laterally offset from neighboring clamps of the first plurality of clamps. The method includes coupling a flexible pipe to the first plurality of clamps to deploy the flexible pipe vertically and in a non-linear manner.

Other aspects and advantages of the claimed subject matter will be apparent from the following description and the appended claims.

DETAILED DESCRIPTION

Figure 1:
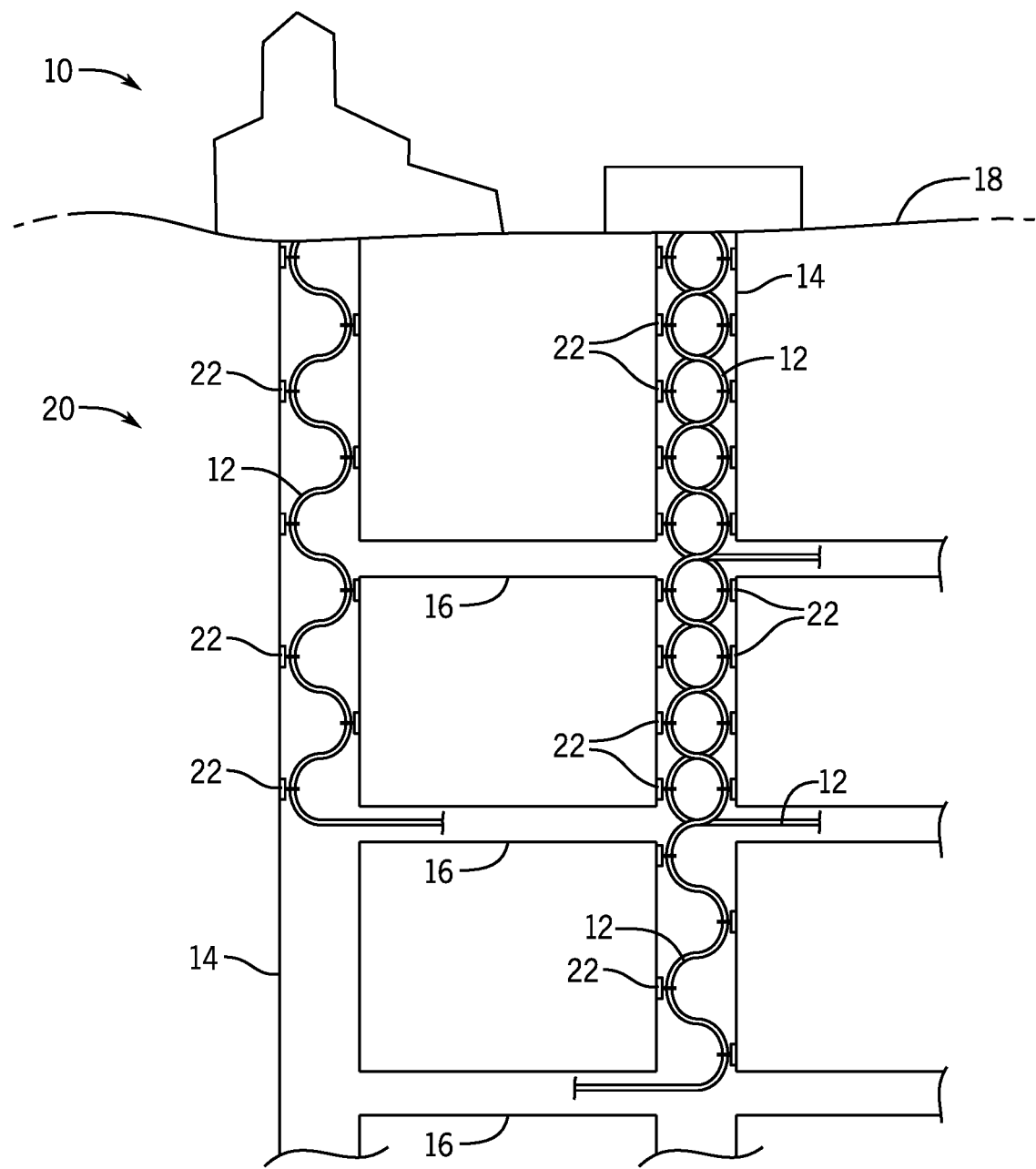
FIG. 1 is a schematic view of a mine with flexible pipe, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Embodiments of the present disclosure relate generally to systems and methods for deploying flexible pipe in a vertical application. Within the context of the present application, vertical refers to a position of the flexible pipe that is oriented at angles between 30-90 degrees with respect to the horizon or a local horizontal surface. These systems and methods may allow flexible pipe to be deployed over much longer vertical distances than previously contemplated, thereby allowing flexible pipe to be used in applications where flexible pipe was previously considered unsuitable. For example, the flexible pipe may be deployed vertically in a mining operation to conduct fluids (e.g., water, chemicals) to various locations within a mine. Because of the great depth that some shafts may extend in a mining operation, the vertical pipe deployment system includes one or more types of clamps that couple to the flexible pipe. The clamps support a section of the pipe, which reduces the tension on the flexible pipe. The flexible pipe may also be deployed in a non-linear manner that facilitates the ability of the clamps to reduce tension on the flexible pipe.

FIG. 1 is a schematic view of a mine 10 with flexible pipe 12. As illustrated, the mine may include a variety of vertical mining shafts 14 (e.g., ventilation shafts) that may extend deep into the earth. For example, the vertical shafts 14 may extend between 200 feet to 800 feet or more. The vertical shafts 14 may also connect to horizontal shafts 16 also referred to as drifts. The horizontal shafts extend from the vertical shafts to the desired mineral deposit (e.g., gold, coal, iron ore). The flexible pipe 12 extends down through the vertical shafts 14 and then into the horizontal shafts 16 to deliver fluids (e.g., water, chemicals, fuel, slurries of fluids and solids) for use in drilling and/or extracting the mineral deposit. Because the vertical shafts 14 extend over significant distances, a flexible pipe 12 that extends downward may experience significant tension. For example, the portions of the flexible pipe 12 closest to the surface 18 may experience significant tension. In order to relieve this tension, the vertical pipe deployment system 20 may include a number of clamps 22 (e.g., connectors) that couple to the exterior surfaces of the shafts 14, 16 and to the flexible pipe 12. The clamps 22 support a portion of the flexible pipe 12 to reduce the overall tension experienced by any one portion of the flexible pipe 12.

In addition to supporting the flexible pipe 12 with clamps 22, the vertical pipe deployment system 20 may suspend the flexible pipe 12 in a non-linear manner. In other words, the flexible pipe 12 may not be hung straight down or in a manner that maximizes distance covered per length of pipe. For example, the flexible pipe 12 may be hung in a wave form (e.g., sinusoidally), in a non-repeating form, in a coil shape form, or combinations thereof. By hanging the flexible pipe 12 in a non-linear manner, the vertical pipe deployment system 20 may reduce tension on the flexible pipe 12 as well as minimize the probability of the flexible pipe 12 to slip or slide through one or more of the clamps 22, which may increase the tension in one or more portions of the flexible pipe 12.

The flexible pipe 12 may be any type of flexible pipe or piping capable of being bent into a coil. The flexible pipe 12 may be wound on a spool or reel, or the flexible pipe 12 may be handled as coils without spools or reels. These reels or coils of flexible pipe 12 may reduce the amount of space taken up by the pipe during manufacturing, shipping, transportation, and deployment compared to rigid pipe that is not capable of being rolled (e.g., bent) into a coil.

Flexible or spoolable pipe is a tube that conveys or transfers any water, gas, oil, or any type of suitable fluid. The flexible pipe 12 may be made of any type of materials including plastics, metals, composites (e.g., fiber-reinforced composites), and/or other suitable materials. The flexible pipe 12 may include Bonded or Unbonded Flexible Pipe, Flexible Composite Pipe (FCP), Thermoplastic Composite Pipe (TCP) or Reinforced Thermoplastic Pipe (RTP). FCP or RTP pipe may itself be generally composed of several layers. In one or more embodiments, a flexible pipe may include a thermoplastic liner or internal pressure sheath having a reinforcement layer and a thermoplastic outer cover layer. In one or more embodiments, the thermoplastic may be high density polyethylene (HDPE). Thus, flexible pipe may include different layers that may be made of a variety of materials and may also provide corrosion resistance. For example, in one or more embodiments, pipe used to make up a coil of pipe may have a corrosion protection outer cover layer that is disposed over another layer of steel reinforcement. In this embodiment, helically wound steel strips may be placed over a liner made of thermoplastic pipe. Flexible pipe may be designed to handle a variety of pressures. Accordingly, flexible pipe may offer unique features and benefits versus steel/carbon steel pipe lines in the area of corrosion resistance, flexibility, installation speed and re-usability. Another type of flexible or spoolable pipe is coiled tubing or reeled tubing, which may be made of steel and have corrosion protection shield layer.

Figure 2:
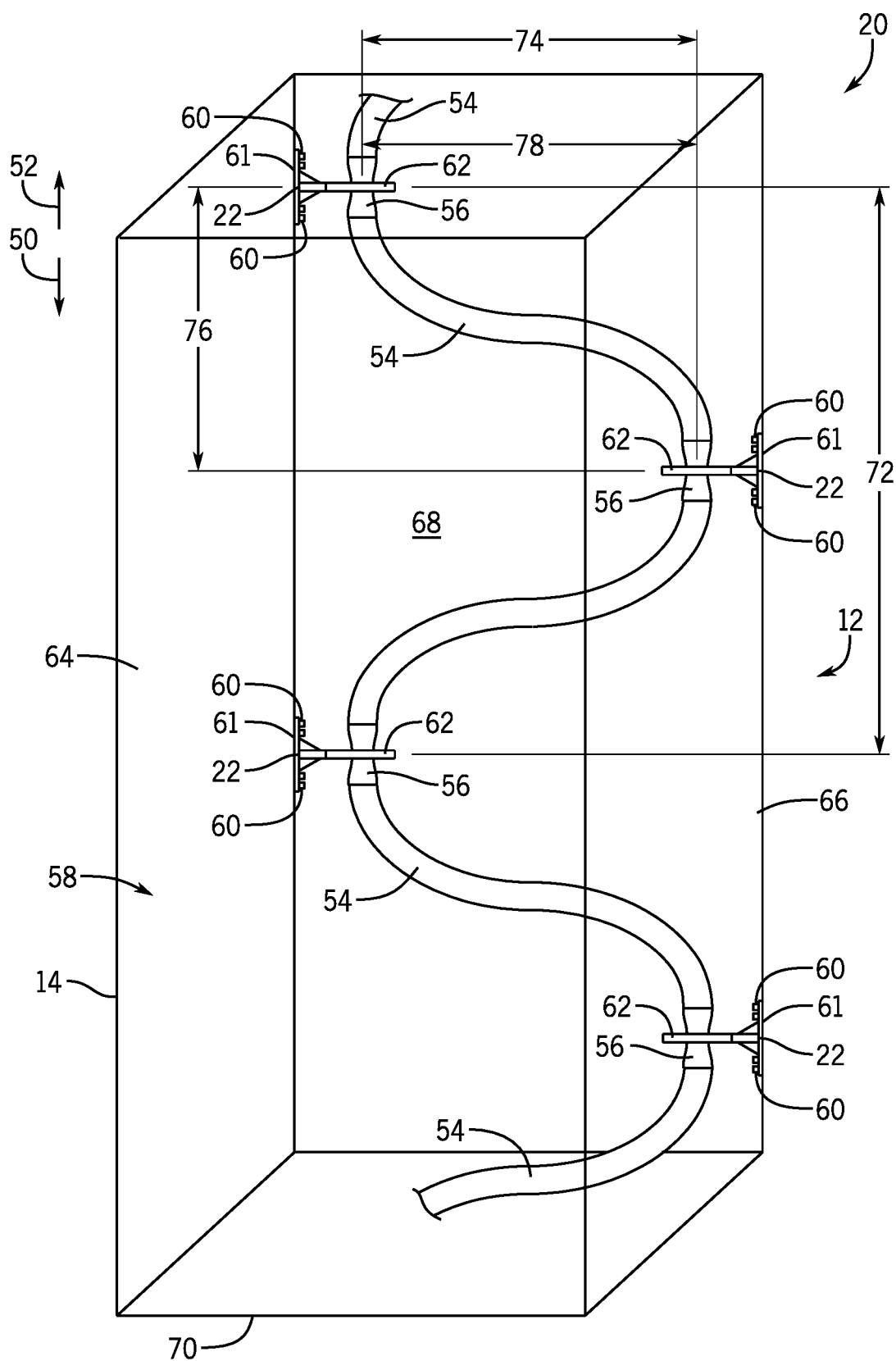
FIG. 2 is a perspective side view of a vertical pipe deployment system, according to embodiments of the present disclosure.

FIG. 2 is a side view of a vertical mine shaft 14 with the vertical pipe deployment system 20. As illustrated, the flexible pipe 12 extends vertically into and out of the mine in directions 50 and 52. In operation, the flexible pipe 12 may carry fluids into and/or out of the mine to facilitate mining operations. The flexible pipe 12 may be constructed from multiple pipe sections 54 that couple together with connectors 56. The connectors 56 couple ends of the pipe sections 54 enabling formation of a flexible pipe 12 with a length sufficient to reach a desired location or locations within the mine.

As explained above, in order to reduce tension on the flexible pipe 12, the vertical pipe deployment system 20 may include one or more types of clamps 22 that couple to the interior surface of the shaft 14 (e.g., rock face of the shaft). For example, holes may be drilled into the interior surface 58 of the shaft 14 to enable bolts 60 to couple a clamp plate 61 to the interior surface 58. The clamp 22 includes a clamp arm 62 that couples to and is supported by the clamp plate 61. The clamp arm 62 couples to the flexible pipe 12 enabling clamp 22 to support a portion of the flexible pipe 12. In some embodiments, a clamp 22 may couple to each connector 56 along the length of the flexible pipe 12. In another embodiment, a clamp 22 may couple to every other connector 56 along the length of the flexible pipe 12. In still other embodiments, the vertical pipe deployment system 20 may irregularly support the flexible pipe 12. In other words, there may not be a set pattern of including a clamp 22 that couples to every coupling, every other coupling, or some other regular interval. Instead, the vertical pipe deployment system 20 may use clamps 22 at irregular intervals to support the flexible pipe 12, which may cause the structure to have multiple different natural frequencies that may offset one another.

As illustrated, the shaft 14 defines a quadrilateral shape (e.g., square, rectangle, rhombus) with four walls 64, 66, 68, and 70 (e.g., sides). In FIG. 2, the clamps 22 couple to opposing walls 64 and 66, and support the flexible pipe 12 against the wall 68. In this way, the clamps may preserve the area of the shaft 14 for other equipment or personnel to move past the flexible pipe 12 in directions 50 and 52. In some embodiments, the clamps 22 may couple to one, two, three, or four of the walls 64, 66, 68, and 70. For example, the clamps 22 may couple to the wall 64 for a specific distance along the shaft 14 after which the clamps 22 may couple to a second wall (e.g., wall 66, 68, or 70). The clamps 22 support the flexible pipe 12 along the second wall (e.g., wall 66, 68, or 70) for another desired distance before transitioning to a third wall (e.g., wall 66, 68, or 70). This transitioning of which wall supports the clamps 22 and thus the flexible pipe 12 may continue along the length of the shaft 14. It should be understood that this discussion is equally applicable to a shaft 14 with a different number of walls (e.g., 3, 4, 5, 6, or more).

In FIG. 2, the vertical pipe deployment system 20 forms a wave pattern (e.g., sinusoidal wave pattern). As explained above, by supporting the flexible pipe 12 in a non-linear manner down the shaft 14, the vertical pipe deployment system 20 may prevent or reduce sliding of the flexible pipe 12 through one or more of the clamps 22. In other words, the vertical pipe deployment system 20 may reduce the tension on sections of the flexible pipe 12 as well as force on one or more of the clamps 22. The wave pattern may repeat itself, have a period 72, based on a specific length of flexible pipe 12, a number of connectors 56 (e.g., 1, 2, 3, 4, 5 or more), and/or on the number of clamps (e.g., 1, 2, 3, 4, 5 or more). For example, the period 72 of the flexible pipe 12 in FIG. 2 may be defined by the number of connectors 56 (e.g., 3 couplings). In other words, the wave pattern repeats itself after 3 connectors 56. As illustrated, the amplitude 74 of the wave pattern of the flexible pipe 12 may be defined by a specific length, by a number of sections 54 of the flexible pipe 12 (e.g., 1, 2, 3 or more sections 54), width of a wall, among others. For example, one section 54 of the flexible pipe 12 may extend between ends of the amplitude 74. In some embodiments, the period 72 of the flexible pipe 12 may vary with depth. For example, the period may increase or decrease as the flexible pipe 12 descends into the mineshaft 14, as the flexible pipe 12 approaches a horizontal shaft 16, or as the flexible pipe 12 recedes from a horizontal shaft 16.

In some embodiments, the flexible pipe 12 may be suspended in a non-repeating or irregular form. For example, the vertical distance 76 between clamps 22 may vary and/or the horizontal distance 78 between clamps 22 may vary while still creating curvature in the flexible pipe 12 that resists slipping or sliding of the flexible pipe 12 through the clamps 22.

Figure 3:
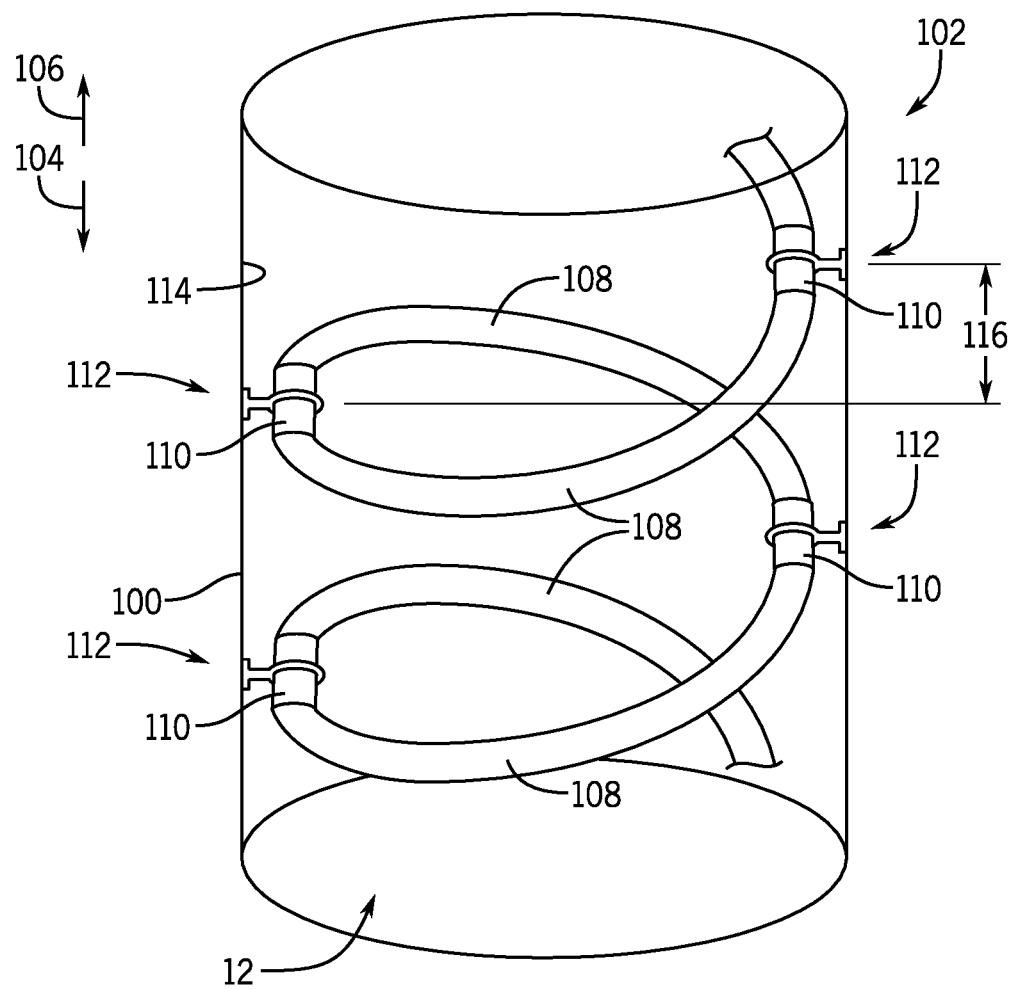
FIG. 3 is a perspective side view of a vertical pipe deployment system, according to embodiments of the present disclosure.

FIG. 3 is a perspective side view of a vertical mine shaft 100 with a vertical pipe deployment system 102. As illustrated, the vertical mine shaft 100 defines a curvilinear (e.g., circular, ellipse) shape that extends vertically in directions 104 and 106. Placed within the shaft 100 is a flexible pipe 12 that enables fluid transport into and out of the mine in directions 104 and 106. The flexible pipe 12 may be constructed from multiple pipe sections 108 that couple together with connectors 110. The connectors 110 couple ends of the pipe sections 108 together enabling formation of the flexible pipe 12 with a length sufficient to reach a desired location or locations within the mine.

As explained above, in order to reduce tension on the flexible pipe 12, the vertical pipe deployment system 102 may include one or more types of clamps 112 that couple to an interior surface 114 of the shaft 100 (e.g., rock face of the shaft). For example, holes may be drilled into the interior surface 114 of the shaft 100 to enable bolts to couple the clamps 112 to the interior surface 114. The clamps 112 couple to the flexible pipe 12 enabling the clamps 112 to support a portion of the flexible pipe 12 (e.g., support a portion of the flexible pipe's weight). In some embodiments, a clamp 112 may couple to each connector 110 along the length of the flexible pipe 12. In another embodiment, a clamp 112 may couple to every other connector 110 along the length of the flexible pipe 12. In still other embodiments, the vertical pipe deployment system 102 may irregularly support the flexible pipe 12. In other words, there may not be a set pattern of including a clamp 112 that couples to every coupling, every other coupling, or some other regular interval. Instead, the vertical pipe deployment system 102 may use clamps 112 at irregular intervals to support the flexible pipe 12.

As illustrated, the flexible pipe 12 may form a spiral (e.g., helix) along the length of the shaft 100. In other words, the flexible pipe 12 may follow the interior surface 114 of the shaft 100 as it progressively descends or ascends through the shaft 100. It should be understood that the flexible pipe 12 may form a spiral regardless of the shape of the shaft (e.g., a quadrilateral shaped shaft). In some embodiments, the flexible pipe 12 may form a spiral along one or more lengths of the shaft 100 and a wave and/or an irregular shape along one or more lengths of the shaft 100 (e.g., as described above in FIG. 2). For example, the flexible pipe 12 may alternate between a spiral and a wave pattern. In another example, the flexible pipe 12 may alternate between a spiral, wave, or irregular shape. In still another example, the flexible pipe 12 may alternate between a wave and an irregular shape or between a spiral and an irregular shape.

In FIG. 3, the couplings are offset approximately 180 degrees from each other about the shaft 100 and vertically offset by a distance 116. In some embodiments, the angular offset and the vertical offset of the clamps 112 may be uniform along the length of the shaft. In other embodiments, the angular and/or the vertical offsets between the clamps 112 may vary (e.g., increase or decrease as the flexible pipe 12 descends in the shaft 100). For example, the angular offsets may vary between 1-360 degrees. In still other embodiments, the angular and the vertical offsets may be uniform over one or more portions of the flexible pipe 12 and vary over one or more other portions of the flexible pipe 12.

Figure 4:
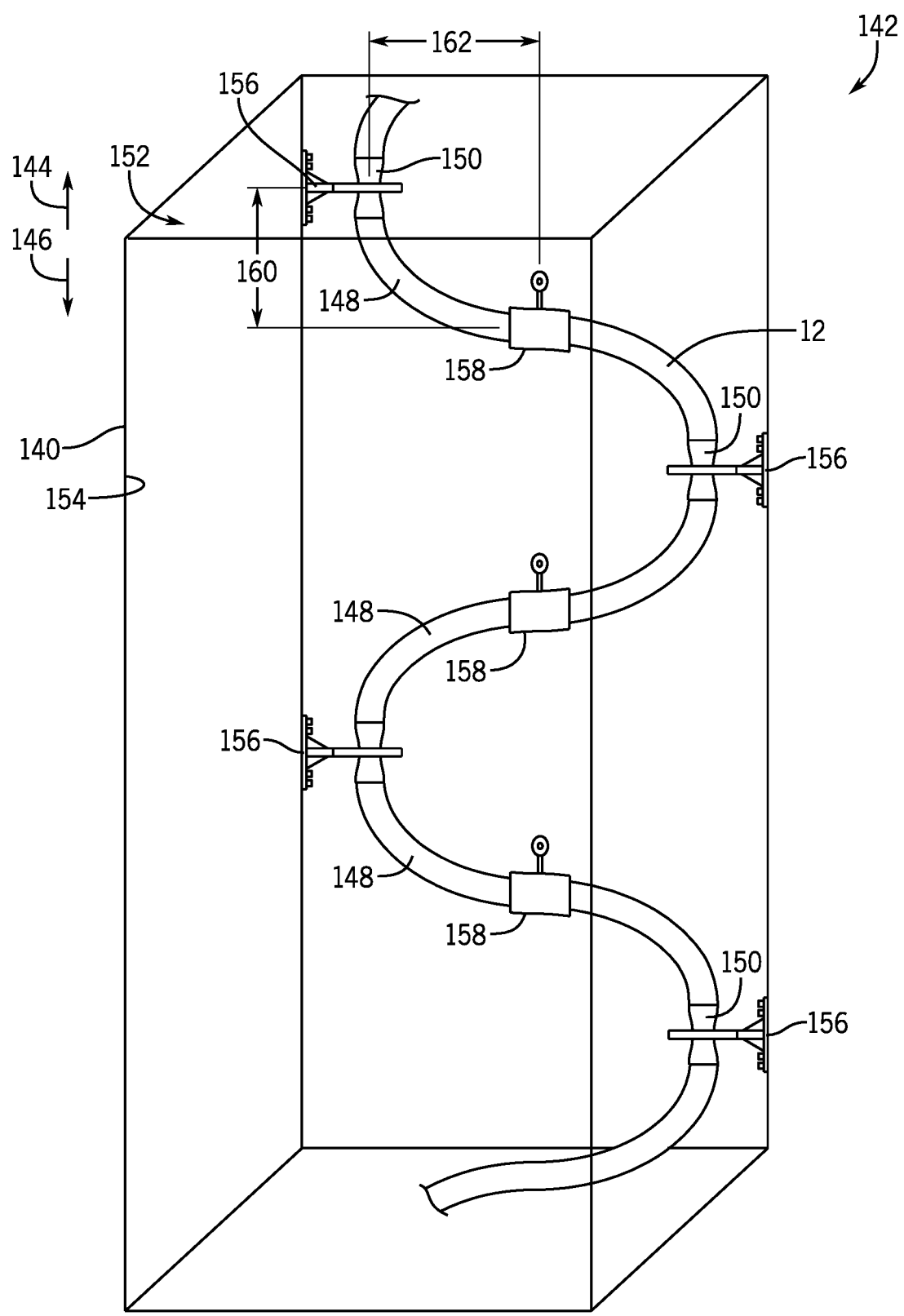
FIG. 4 is a perspective side view of a vertical pipe deployment system, according to embodiments of the present disclosure.

FIG. 4 is a perspective side view of a vertical mine shaft 140 with a vertical pipe deployment system 142. Placed within the shaft 140 is a flexible pipe 12 that enables fluid transport into and out of the mine in directions 144 and 146. The flexible pipe 12 may be constructed from multiple pipe sections 148 that couple together with couplings 150. The couplings 150 couple to ends of the pipe sections 148 together enabling formation of the flexible pipe 12 with a length sufficient to reach a desired location or locations within the mine.

As explained above, to reduce tension on the flexible pipe 12, the vertical pipe deployment system 142 includes clamps 152 that couple to an interior surface 154 of the shaft 140 (e.g., rock face of the shaft). For example, holes may be drilled into the interior surface 154 of the shaft 140 to enable bolts to couple the clamps 152 to the interior surface 154. The clamps 152 couple to the flexible pipe 12 enabling the clamps 152 to support a portion of the flexible pipe 12 (e.g., support a portion of the weight of the flexible pipe 12).

In some embodiments, the vertical pipe deployment system 142 may include different types of clamps 152. For example, the vertical pipe deployment system 142 may include primary clamps 156 and secondary clamps 158. The primary clamps 156 may couple to each coupling 150 along the length of the flexible pipe 12, while the secondary clamps 158 couple to the flexible pipe 12 between the primary clamps 156. In some embodiments, there may be more than one secondary clamp 158 (e.g., 2, 3, 4, 5 or more) between the primary clamps 156. In another embodiment, the placement of the primary clamps 156 and the secondary clamps 158 may not form an alternating pattern. In other words, there may not be a set pattern of primary clamps 156 and secondary clamps 158. For example, the primary clamps 156 may couple to the flexible pipe 12 near the start of the vertical mine shaft 140 and as the flexible pipe 12 descends further in direction 146 the secondary clamps 158 may be used.

In some embodiments, the vertical distance 160 and/or the horizontal/lateral distance 162 between the primary clamps 156 and the secondary clamps 158 may be uniform. In other embodiments, the vertical distance 162 and/or the horizontal/lateral distance 162 between the primary clamps 156 and the secondary clamps 158 may vary.

Figure 5:
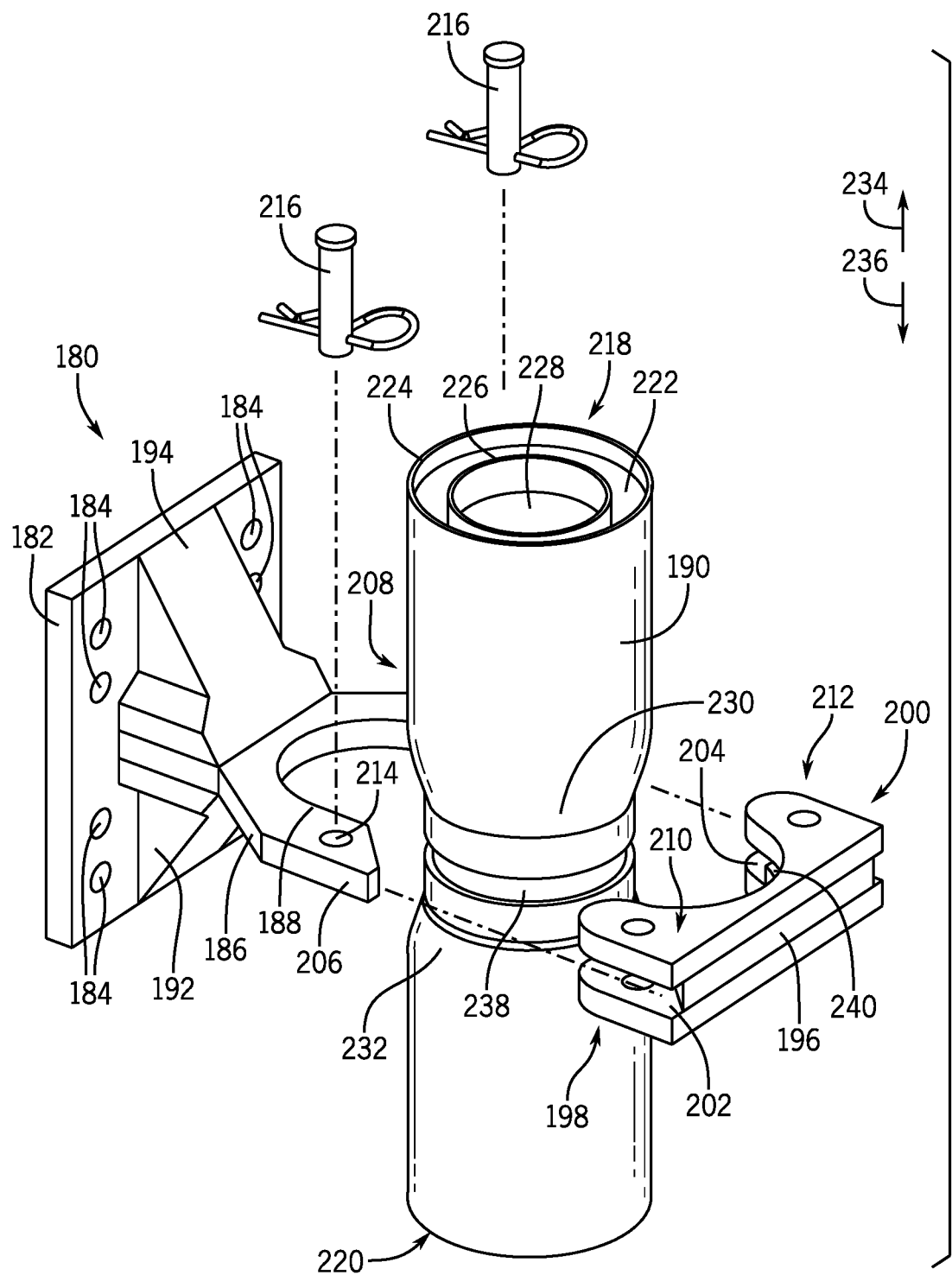
FIG. 5 is a perspective view of a clamp that couples to flexible pipe with the clamp system in an open position, according to embodiments of the present disclosure.

FIG. 5 is a perspective view of one example of a clamp 180 in an open position. The clamp 180 may be included in the vertical pipe deployment systems described above to support flexible pipe 12 that is deployed vertically (e.g., deployed in a vertical mine shaft). The clamp 180 includes a plate 182. The plate 182 defines a number of apertures 184 that receive bolts that enable the plate 182 to couple to a surface in a mineshaft (e.g., rock face). An arm 186 couples to the plate 182. The arm 186 defines a recess or groove 188 that receives the flexible pipe 12, a coupling 190, or an end fitting (e.g., fitting at the end of the flexible pipe 12). In some embodiments, the clamp 180 may include first and second support bodies 192 and 194 that support the arm 186 (e.g., resist torsion of the arm 186). In some embodiments, the arm 186 and the first and second support bodies 192, 194 are one-piece (e.g., formed from a single piece of material). The clamp 180 includes a connector plate 196. The connector plate 196 extends between a first end 198 and a second end 200. The first and second ends 198 and 200 define respective grooves or recesses 202, 204. The grooves 202 and 204 enable the connector plate 196 to receive respective arm ends 206 and 208 of the arm 186. It should be understood that the arm 186 and the connector plate 196 may be swapped. In order to couple the connector plate 196 to the arm 186, the first end 198 and second end 200 of the connector plate 196 define respective apertures 210 and 212. As the connector plate 196 slides over the arm ends 206 and 208, the apertures 210 and 212 align with apertures 214 in the arm ends 206 and 208. Once aligned, retention pins 216 are inserted through the apertures 210, 212, and 214 to block removal of the connector plate 196. The retention pins 216 may be secured with cotter pins, welding, etc. In some embodiments, the retention pin 216 may be a bolt that is secured with a nut.

As illustrated, the coupling 190 defines a first end 218 and a second end 220. The first and second ends 218, 220 receive and couple to the ends of sections of flexible pipe. More specifically, the coupling 190 receives ends of flexible pipe in a gap 222 between an outer cylinder 224 and an inner cylinder 226 of the coupling 190. In operation, fluid flowing through the flexible pipe 12 passes through the coupling 190 by flowing through an aperture 228 defined by the inner cylinder 226. In some embodiments, the shape of the coupling 190 may facilitate coupling and retention of the coupling 190 by the clamp 180. As illustrated, the coupling 190 defines first and second tapers 230 and 232. The tapers 230 and 232 neck down the outer cylinder 224 forming an hourglass like exterior shape. Upon coupling to the clamp 180, the first and second tapers 230 and 232 resist movement of the coupling in directions 234 and 236 through the groove 188. In other words, the tapers 230 and 232 contact the clamp arm 186 and the connector plate 196, which block movement in directions 234 and 236. In some embodiments, the coupling 190 may also define a groove 238 (e.g., circumferential groove) that receives a protrusion 240 on the connector plate 196. In operation, the protrusion 240 also blocks movement of the coupling 190 by resting in the groove 238.

Figure 6:
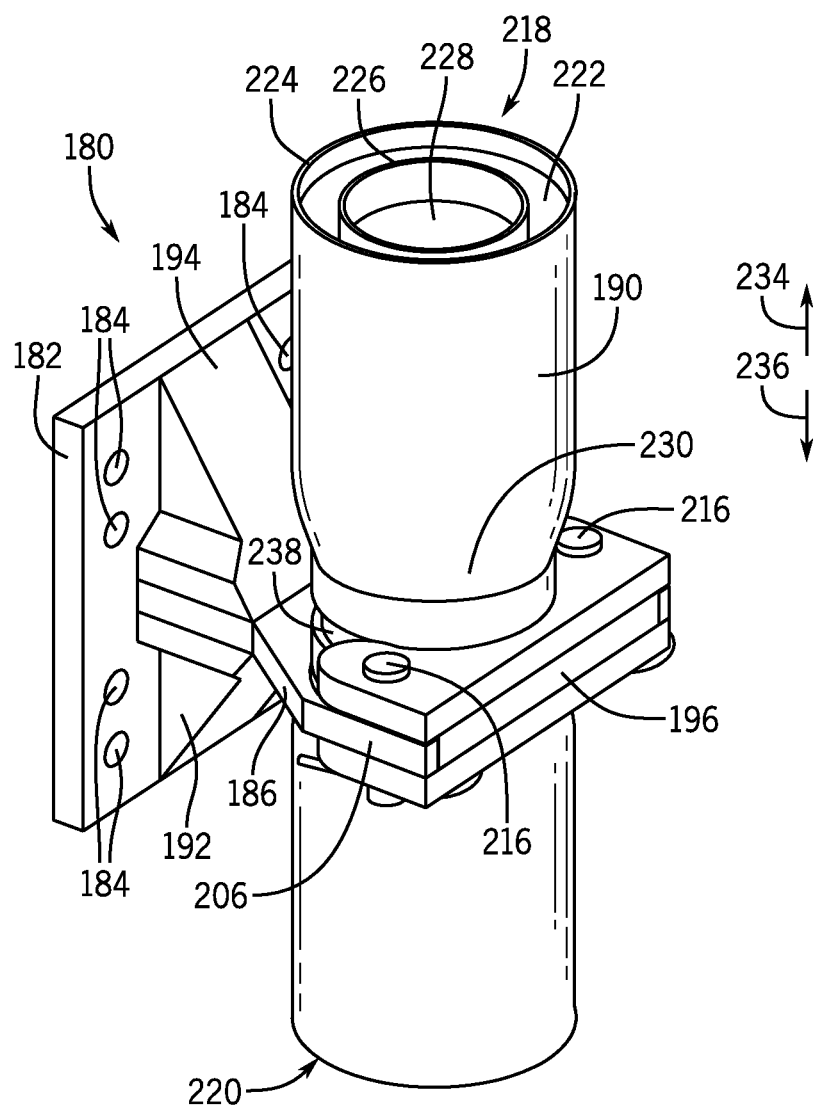
FIG. 6 is a perspective view of a clamp of FIG. 5 with the clamp in a closed position, according to embodiments of the present disclosure.

FIG. 6 is a perspective view of the clamp 180 of FIG. 5 with the clamp 180 in a closed position. As illustrated, in the closed position the clamp 180 may securely couple to a coupling 190. As explained above, the connector plate 196 defines grooves or recesses 202, 204 that receive the respective arm ends 206 and 208 of the arm 186. After inserting the opposing arm ends 206, 208 into the respective grooves 202, 204 of the connector plate 196, the retention pins 216 are inserted through the apertures 210, 212, and 214 to block removal of the connector plate 196 from the arm 186. In this closed position, the clamp 180 blocks movement of the coupling 190 in directions 234 and 236.

Figure 7:
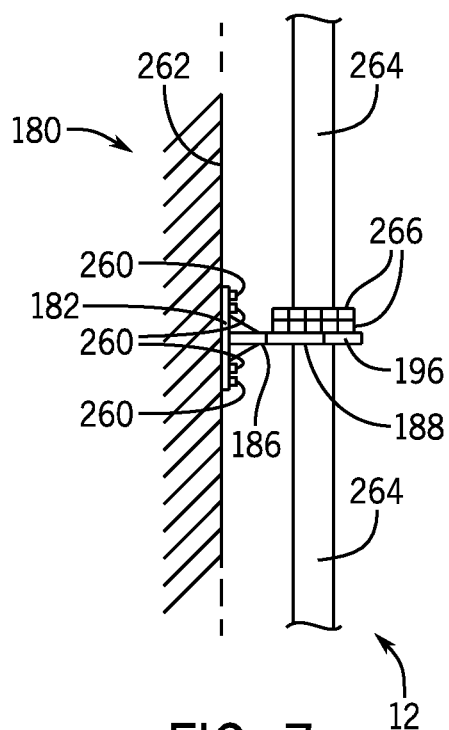
FIG. 7 is a side view of a clamp coupled to a flexible pipe, according to embodiments of the present disclosure.

FIG. 7 is a side view of the clamp 180. As illustrated, the plate 182 receives bolts 260 that enable the plate 182 to couple to a surface 262 in a mineshaft (e.g., rock face). As explained above, the arm 186 defines a groove 188 that enables the flexible pipe 12 to extend through the clamp 180. In FIG. 7, the flexible pipe sections 264 include flanges 266 that enable the flexible pipe sections 264 to couple to each other. In addition to coupling the flexible pipe sections 264, the flanges 266 enable the clamp 180 to support portions of the flexible pipe 12. Specifically, the flanges 266 have an area greater than the groove 188. The flanges 266 therefore block movement of the flexible pipe 12 through the clamp 180 by contacting the clamp 180 (e.g., arm 186 and connector plate 196).

Figure 8:
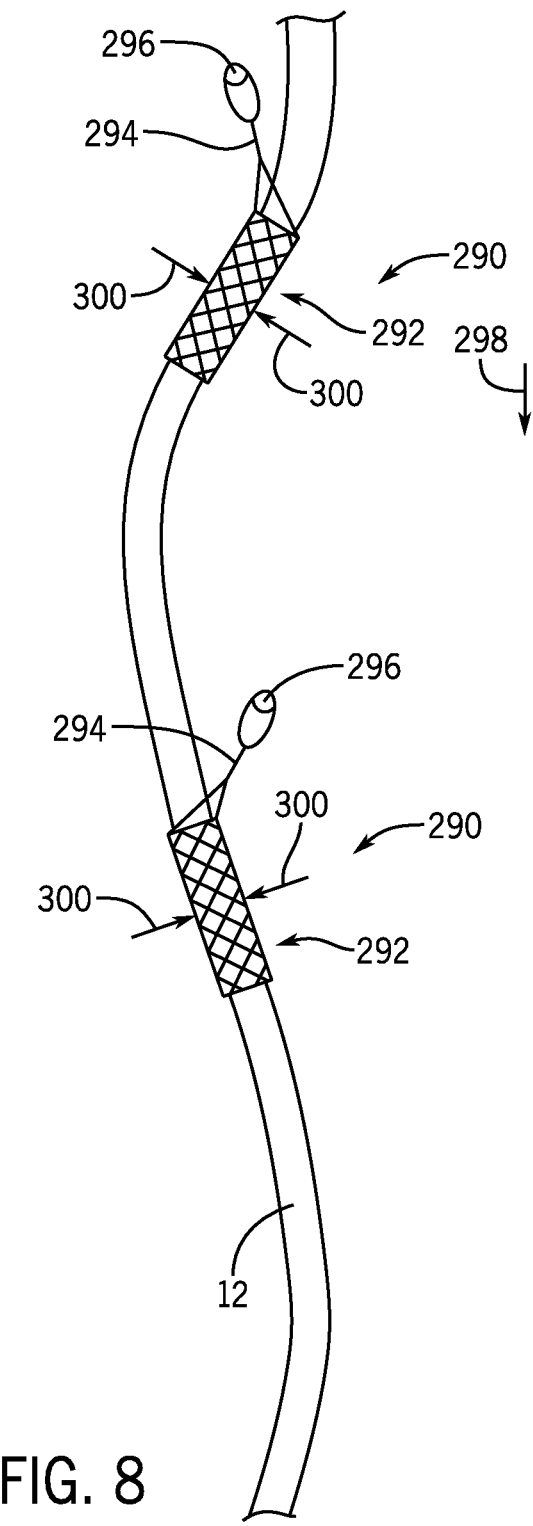
FIG. 8 is a side view of clamps coupled to a flexible pipe, according to embodiments of the present disclosure.

FIG. 8 is a side view of clamps 290 (e.g., secondary clamps 158 seen in FIG. 4) coupled to a flexible pipe 12. The clamps 290 may also be referred to as wire mesh grips. Wire mesh grips may relieve strain over a large area to prevent wear of the flexible pipe 12. The clamps 290 include a wire mesh 292 that connects to a wire loop 294. In operation, the wire loop 294 is placed over a bolt 296. The bolt 296 may anchor to a rock face of a mine shaft. The clamps 290 are activated by movement of the flexible pipe 12 in direction 298. The movement of the flexible pipe 12 in direction 298 places tension on the wire loop 294. As the wire loop 294 resists movement in direction 298 the wire loop 294 pulls on the wire mesh 292. The pull of the wire loop 294 on the wire mesh 292 causes the wire mesh 292 reduce in diameter and thus tighten about the flexible pipe 12. In order words, the wire mesh 292 forms a compressive grip in directions 300 on the flexible pipe 12. In this way, the grip of the clamps 290 on the flexible pipe 12 support and reduce the tension in the vertically deployed flexible pipe 12.

While certain examples of clamps have been discussed above, it should be understood that other types of clamps may be used that support vertically deployed flexible pipe. For example, riser clamps used in subsea oil and gas applications may also be used to support vertically deployed flexible pipe.

Technical effects of the invention include a vertical pipe deployment system and method that supports and reduces the tension load on vertically deployed flexible pipe using one or more types of clamps and deploying the flexible pipe in a non-linear manner.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
   a flexible pipe configured to be deployed vertically in a shaft, wherein the flexible pipe comprises a pipe section and a pipe connector that is connected to the pipe section, wherein the pipe connector comprises a flange;
   a clamp configured to be secured circumferentially around the flexible pipe, wherein the clamp comprises:
      a plate having a plate aperture; and
      arms that extend out from the plate to define a groove, wherein the groove is configured to receive the flexible pipe and the arms of the clamp are configured to directly abut the flange of the pipe connector to enable the clamp to facilitate supporting weight of the flexible pipe within the shaft; and
   a bolt configured to secure the clamp to a wall of the shaft to enable the clamp to facilitate supporting weight of the flexible pipe within the shaft, wherein the bolt is configured to be secured to the wall of the shaft through the plate aperture to facilitate securing the clamp to the wall of the shaft.

2. The system of claim 1, wherein the flexible pipe is configured to be deployed non-linearly in the shaft to form a sinusoidal wave pattern or a spiral pattern.

3. The system of claim 1, wherein the clamp is configured to be secured circumferentially around the pipe connector in the flexible pipe to enable the clamp to facilitate supporting the weight of the flexible pipe within the shaft.

4. The system of claim 3, comprising:
   another clamp configured to be secured circumferentially around the pipe section in the flexible pipe; and
   another bolt configured to secure the other clamp to the wall of the shaft or another wall of the shaft to enable the other clamp to facilitate supporting the weight of the flexible pipe within the shaft.

5. The system of claim 1, wherein the clamp comprises a support body connected to the plate and the arms of the clamp to facilitate supporting the arms of the clamp.

6. A system comprising:
   a bolt configured to be secured to a wall of a shaft in which a flexible pipe is to be vertically and non-linearly deployed; and
   a clamp, wherein the clamp comprises:
      a plate having a plate aperture, wherein the bolt is configured to be secured to the wall of the shaft through the plate aperture to facilitate securing the clamp to the wall of the shaft;
      arms that extend out from the plate to define a groove, wherein the groove is configured to receive the flexible pipe to enable the clamp to facilitate supporting weight of the flexible pipe within the shaft and the arms of the clamp comprise an arm aperture;
      a connector plate configured to be secured to the arms of the clamp, wherein the connector plate comprises a protrusion configured to matingly interlock with a circumferential groove on a pipe connector in the flexible pipe to facilitate securing the clamp to the pipe connector and a connector aperture configured to be aligned with the arm aperture in the arms of the clamp; and
      a retention pin configured to be inserted through the arm aperture in the arms of the clamp and the connector aperture in the connector plate to facilitate securing the connector plate to the arms of the clamp such that the pipe connector is disposed between the arms and the connector plate of the clamp.

7. The system of claim 6, wherein the arms of the clamp are configured to matingly interlock with the circumferential groove on the pipe connector in the flexible pipe to facilitate securing the clamp to the pipe connector.

8. The system of claim 6, wherein the clamp comprises a support body connected to the plate and the arms of the clamp to facilitate supporting the arms of the clamp.

9. The system of claim 6, comprising:
   another bolt configured to be secured to the wall of the shaft or another wall of the shaft; and
   another clamp, wherein:
      the flexible pipe comprises a pipe section; and
      the another clamp comprises:
         a wire loop configured to be disposed around the bolt; and
         a wire mesh connected to the wire loop, wherein the another clamp is configured to contract the wire mesh around the pipe section in the flexible pipe due to the weight of the flexible pipe to facilitate securing the other clamp to the pipe section to enable the other clamp to facilitate supporting the weight of the flexible pipe within the shaft.

10. A system comprising:
    a bolt configured to be secured to a wall of a shaft in which a flexible pipe comprising a pipe section is to be vertically and non-linearly deployed; and
    a clamp, wherein the clamp comprises:
       a wire loop configured to be disposed around the bolt; and
       a wire mesh connected to the wire loop, wherein the clamp is configured to contract the wire mesh around the pipe section in the flexible pipe due to weight of the flexible pipe to facilitate securing the clamp to the pipe section to enable the clamp to facilitate supporting the weight of the flexible pipe within the shaft.

11. The system of claim 10, comprising:
another bolt configured to be secured to the wall of the shaft or another wall of the shaft, wherein the flexible pipe comprises a pipe connector having a circumferential groove; and
another clamp, wherein the another clamp comprises:
   a plate having a plate aperture, wherein the another bolt is configured to be secured to the wall of the shaft or the another wall of the shaft through the plate aperture to facilitate securing the another clamp to the wall of the shaft or the another wall of the shaft;
   arms that extend out from the plate; and
   a connector plate configured to be secured to the arms of the clamp, wherein the connector plate comprises a protrusion configured to matingly interlock with the circumferential groove on the pipe connector in the flexible pipe to facilitate securing the clamp to the pipe connector to enable the another clamp to facilitate supporting the weight of the flexible pipe within the shaft.

\* \* \* \* \*